March 29, 1932. A. R. DUNBAR 1,851,820
APPARATUS FOR TREATING THE CONTENTS OF CLOSED CONTAINERS
Filed April 20, 1929 3 Sheets-Sheet 2

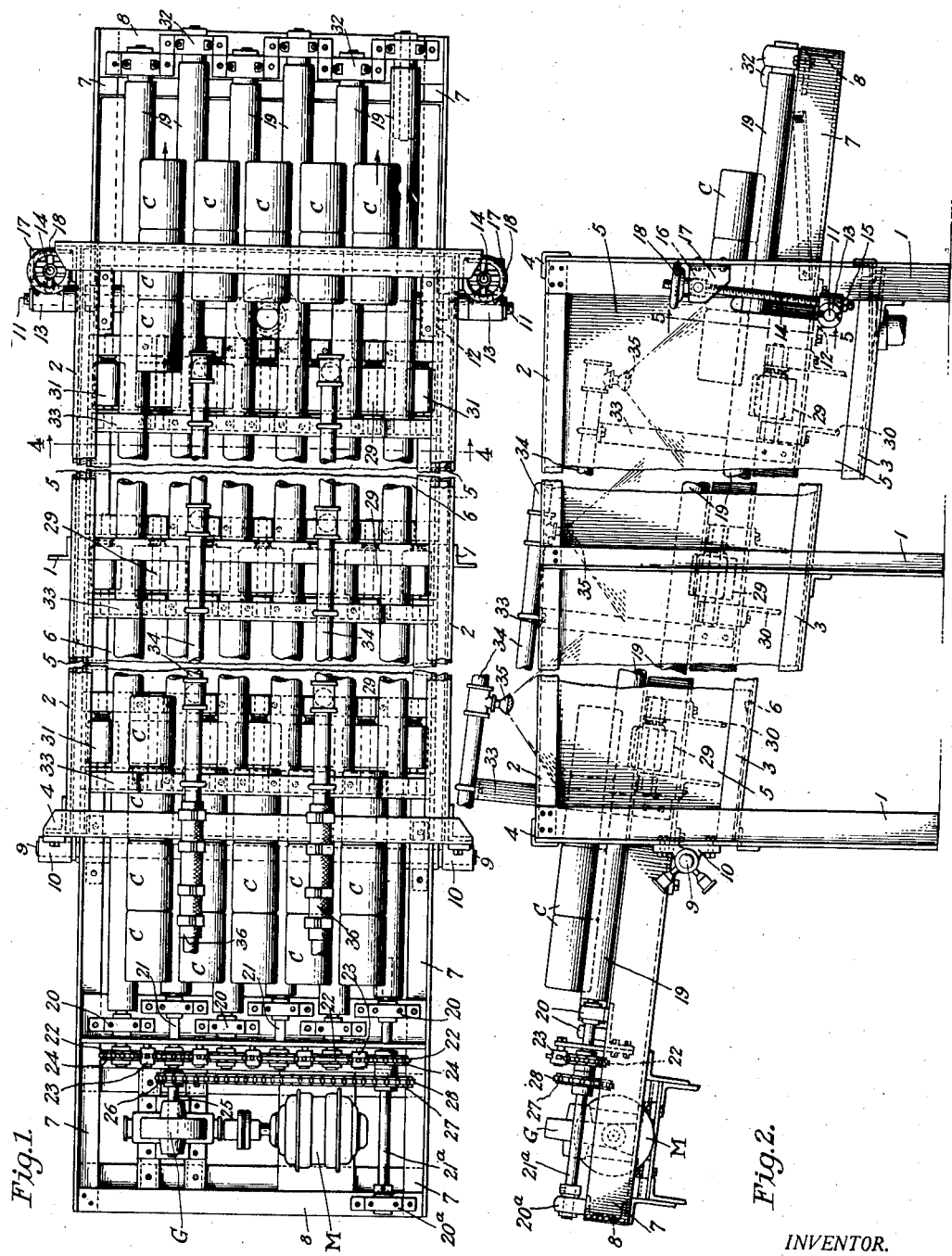

INVENTOR.
Arch R. Dunbar
BY
Sturtevant & Mason
ATTORNEYS

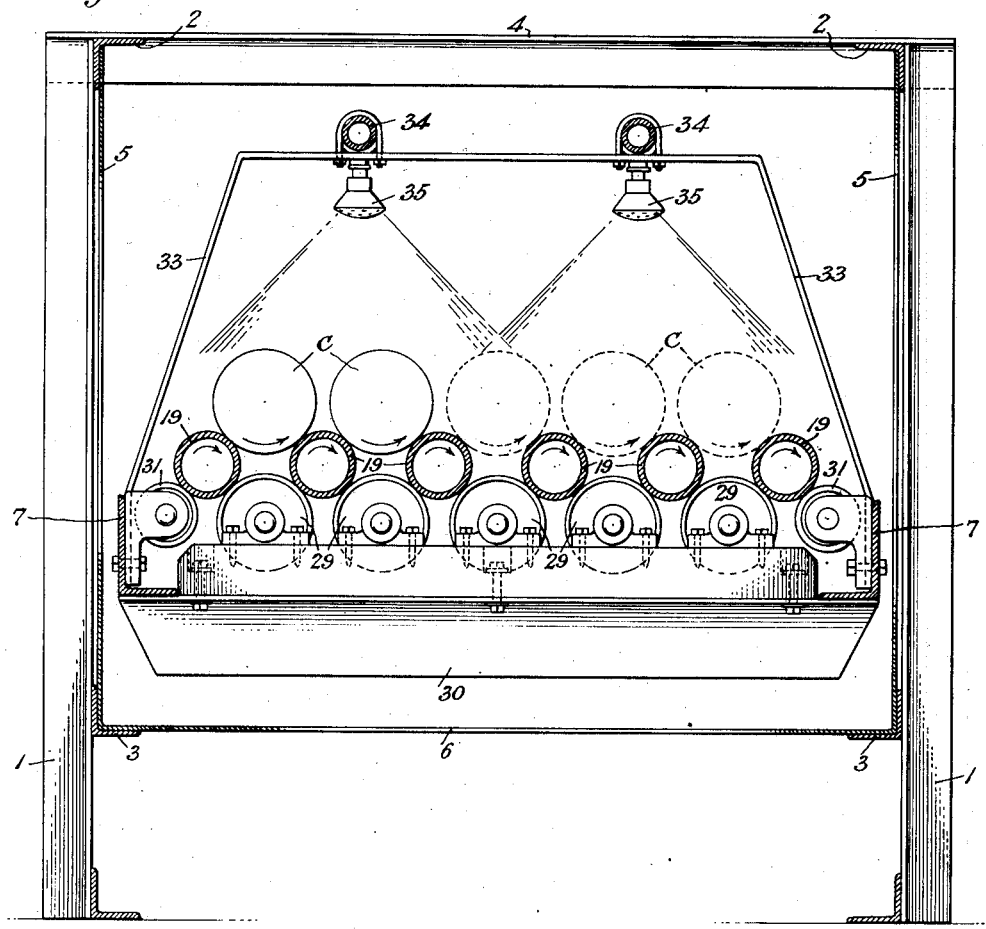
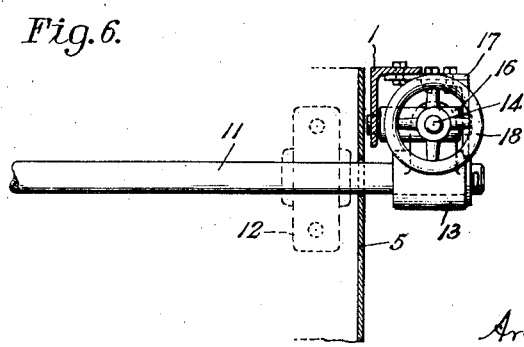

Patented Mar. 29, 1932

1,851,820

UNITED STATES PATENT OFFICE

ARCH R. DUNBAR, OF GRIMES, IOWA, ASSIGNOR TO CONTINENTAL CAN COMPANY, INC., OF NEW YORK, N. Y., A CORPORATION OF NEW YORK

APPARATUS FOR TREATING THE CONTENTS OF CLOSED CONTAINERS

Application filed April 20, 1929. Serial No. 356,746.

The invention relates to new and useful improvements in an apparatus for treating the contents of a closed container.

An object of the invention is to provide an apparatus wherein the contents of closed containers may be treated by the application of a treating medium to the exterior thereof while said containers are in motion and for agitating the contents during treatment.

A further object of the invention is to provide an apparatus of the above character wherein the extent to which the contents are agitated may be varied without varying materially the speed of travel of the containers.

These and other objects will in part be obvious and will in part be hereinafter more fully disclosed.

In the drawings which show by way of illustration one embodiment of the invention:—

Fig. 1 is a plan view of an apparatus embodying the improvements.

Fig. 2 is a side view of the same.

Fig. 4 is a sectional view on the line 4—4 of Fig. 1.

Fig. 6 is a view partly in plan and partly in section of one of the adjusting devices.

Figure 3:
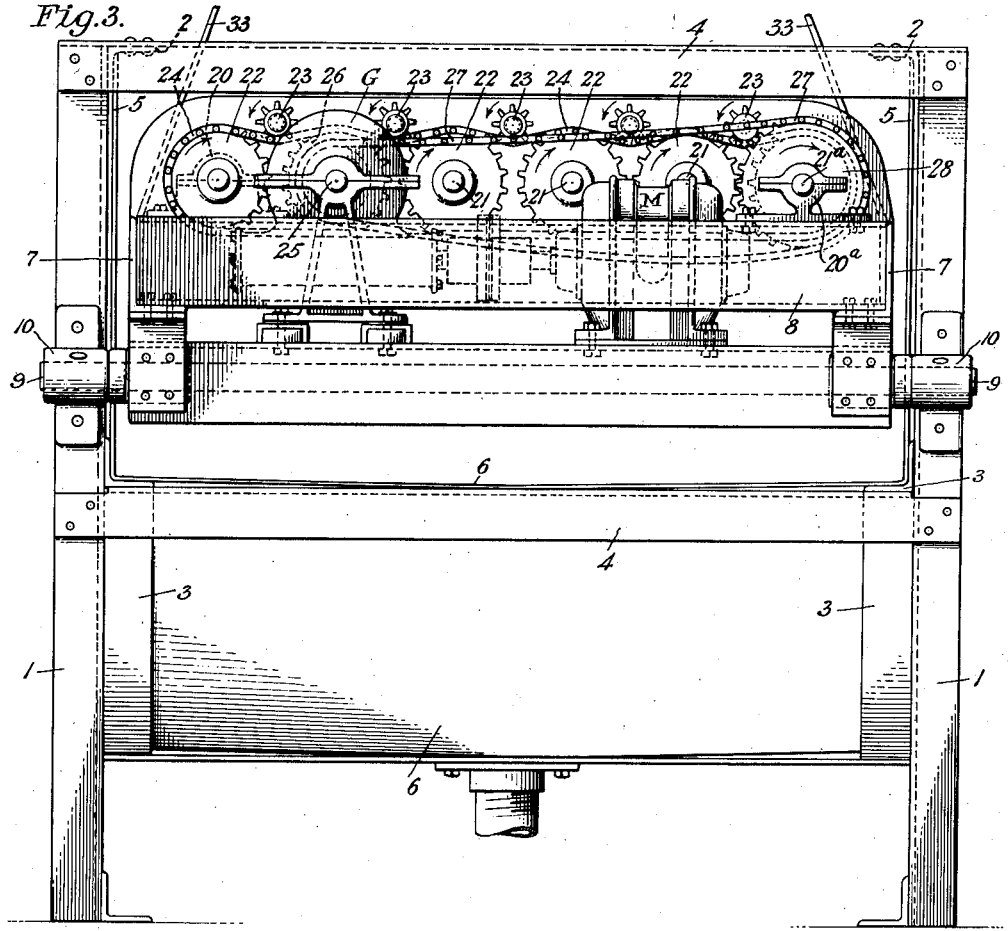
Fig. 3 is a view of the apparatus from the receiving end.
Figure 5:
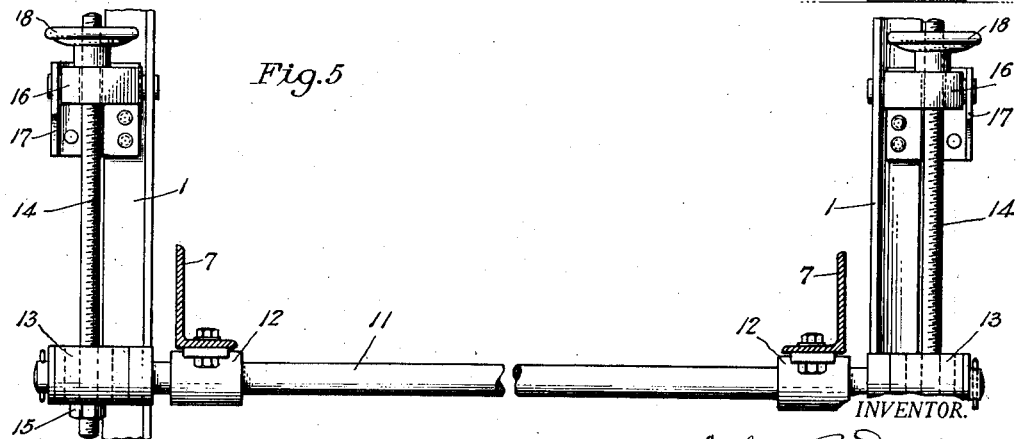
Fig. 5 is a sectional view on the line 5—5 of Fig. 2 showing the means for raising and lowering the supporting means for the containers.

The invention is directed to improvements in an apparatus for treating the contents of filled closed containers. The apparatus includes a suitable supporting frame in which is mounted the means for conveying the containers through the apparatus. This conveying means consists of a series of tubular tracks. The apparatus is particularly adapted for treating the contents of cylindrical containers and these tubular tracks are so disposed that the containers rest on the adjacent faces of two tubular tracks and slide endwise along the same. As shown in the drawings, the containers are moved by gravity along these tubular tracks and the tracks are adjustable so that the angularity may be varied for increasing the speed of travel of the containers. The tubular tracks are rotating as the containers slide along the same and as the containers are supported solely by the tracks they will be given a rotary motion as well as an endwise movement. The rotating of the containers is what causes the contents of the containers to be stirred and agitated, thus bringing different portions of the contents to the outer surface adjacent the metal parts of the container.

As the containers slide along the tracks rotating in their path of travel, a treating medium is supplied from above onto the containers. This may be in the form of a cooling fluid for cooling the containers; it may also be in the form of a heating fluid.

Referring more in detail to the drawings, the apparatus includes a supporting frame consisting of vertical supporting members 1, 1 which are joined at their top ends by angle bars 2 extending from one end of the frame to the other. They are also joined by angle bars 3 extending from one end of the frame to the other. The side frames are joined by angle bars 4 which extend across the frame. This makes a very strong framework. A sheet of metal extends across the bottom at 6 and up the sides at 5, 5. This makes a housing extending from one end of the frame to the other, open at the top and ends.

Located within this housing is the supporting and conveying means for the containers. This supporting means for the containers consists of a supporting frame including side members 7, 7 and cross members 8, 8. Extending across the frame near the receiving end of the apparatus is a supporting shaft 9 which is mounted in suitable bearings 10, 10 carried by the outer frame structure. This shaft can turn in the bearings, thus permitting the supporting means for the containers to be adjusted as to angularity. The other end of the supporting frame for the containers is provided with a cross shaft 11 journaled in suitable bearings 12, 12 in the supporting frame for the containers. The shaft 11 is mounted at its outer end in brackets 13, 13. Each bracket is provided with a sleeve supported on a threaded shaft 14. A nut 15 underneath this sleeve supports the same.

The threaded shaft 14 passes through a supporting collar 16 which is in turn supported by a bracket 17 carried by the outer frame structure. On the upper end of the shaft is a hand wheel 18. By turning this hand wheel the threaded shaft 14 is raised or lowered and this raises or lowers the delivery end of the supporting means for conveying the containers.

Mounted on this supporting means for conveying the containers are a series of tubular tracks 19, 19. These tracks are spaced from each other. Each tubular member is mounted in a bracket 20 at its upper end and is provided with a projecting shaft 21 carrying a sprocket wheel 22. Intermediate the sprocket wheels 22 are idler sprockets 23. A sprocket chain 24 passes under the idlers and over sprocket wheels 22 and imparts rotation to these sprocket wheels simultaneously in the same direction. The shaft 21 of the outer tubular member is extended as indicated at 21a and the outer end thereof is journaled in a bracket 20a. Mounted on this supporting frame for the containers is a motor M. This motor through a worm reduction gear G drives a shaft 25 carrying a sprocket wheel 26. A sprocket chain indicated at 27 runs over this sprocket wheel 26 and a sprocket wheel 28 carried by the shaft 21a. Thus it is that the outer tubular member is rotated from the motor and through the sprocket chain 24 all the other tubular members are rotated and said tubular members all rotate in the same direction as indicated by the arrows in Fig. 4.

These tubular members intermediate their ends are mounted on sets of rollers 29 journaled in suitable brackets carried by cross supports 30. These cross supports are carried by the side members forming the inner supporting structure for the containers. There are also supporting rollers 31 at each side which assist in supporting the outer tubular members.

The tubular members are each provided with a projecting shaft which is journaled in a suitable bearing 32 carried by a bracket at the lower end of the frame structure. The containers are indicated at C in the drawings. These containers rest on the tubular tracks so that the longitudinal axes of the containers are parallel with the longitudinal axes of the tubular tracks. The tubular tracks, as shown in the drawings, are inclined and when the containers are placed thereon they will slide by gravity along these tubular tracks. The containers are loaded onto the tubular tracks at the left hand end as viewed in Fig. 2, and after sliding down the tracks they are unloaded therefrom at the extreme right hand end.

The loading and unloading may be accomplished in any desired way and no means has been illustrated for accomplishing this purpose.

Inasmuch as the containers are placed end to end on these tubular tracks there will be a line of containers between adjacent tubular tracks. As shown in the drawings, there are six tubular tracks and on these six tubular tracks are five rows of containers. Each row of containers might be referred to as a unit as each unit independently performs its function. The containers are fed onto the tubular tracks at the upper ends thereof and slide down the tracks to the lower ends thereof from which they are discharged. During this travel of the containers along the tubular tracks said tracks are rotated and this will impart to the cylindrical containers a rotation during the travel of the containers from one end of the apparatus to the other. During this travel the containers may be rotated several times. The number of times the container is rotated will depend upon the speed of rotation and angle of the tubular tracks. In a large measure the speed of endwise movement of the containers is independent of the speed of rotation of the tracks as the endwise movement of the containers is brought about through the action of gravity. Therefore, the speed of rotation of the containers may be varied without varying materially the speed of forward travel of the containers.

Mounted on the inner supporting structure for the containers are bracket members 33, 33. Extending lengthwise of the apparatus are pipes 34, 34. There are two pipes as shown in the drawings. Carried by said pipes at spaced intervals are sprinklers 35. These pipes are supplied through flexible connections 36 with a suitable medium for treating the containers. If the containers are to be cooled then cold water may be thrown from the sprinklers onto the traveling containers sliding along the rotating tubular tracks. These pipes may be supplied with steam if desired for heating the contents of the containers. Whatever the treating medium may be the contents of the containers are treated by the medium by applying it to the exterior of the containers which, of course, are closed. Inasmuch as the containers are rotated during treatment the contents will be agitated and moved from the center thereof outwardly toward the outer parts of the container where they come in contact with the inner face of the metal. Through this agitation of the contents of the container the time of treatment in the cooling or heating of the food product is greatly reduced and a very thorough and efficient treatment is accomplished.

It will be understood, of course, that the containers may be moved along the tubular tracks particularly for the purpose of agitating the contents without subjecting the containers to a treating fluid. It will be understood, of course, that the tracks may be otherwise arranged and other means than gravity used for moving the containers along the tubular tracks. The essential feature of the invention consists in the use of tubular tracks which are rotated so as to rotate the containers and the moving of the containers in an endwise direction along said tubular tracks. The tracks are referred to as "tubular", but it will be understood that they may be solid or constructed in any suitable way so long as they are cylindrical so that they may impart a rotation to the cylindrical containers resting on and sliding along the same. The treating fluid sprayed against the containers will be retained within the outer frame structure between the side and bottom plates and can be drawn off through a suitable pipe at the lower end of said supporting structure.

It will be obvious that minor changes in the details of construction and the arrangement of the parts may be made without departing from the spirit of the invention as set forth in the appended claims.

Having fully described my invention, what I claim as new and desire to secure by Letters Patent, is:—

1. An apparatus for conveying closed cylindrical containers and treating the contents thereof including spaced cylindrical members for supporting the containers with and disposed between the axes of the containers parallel with the axes of the supporting members, whereby said containers may move in an endwise direction along said supporting members, and means for rotating said supporting members for imparting rotation to the containers as they move endwise on said supporting members.

2. An apparatus for conveying closed cylindrical containers and treating the contents thereof including spaced cylindrical members for supporting the containers with the axes of the containers parallel with the axes of the supporting members, means for mounting said supporting members so that said members incline downwardly from the receiving end to the delivery end whereby the containers are caused by gravity to slide endwise along said supporting members, and means for rotating said supporting members for imparting a rotation to the containers as they move endwise on said supporting members.

3. An apparatus for conveying closed cylindrical containers and treating the contents thereof including spaced cylindrical members for supporting the containers with and disposed between the axes of the containers parallel with the axes of the supporting members, whereby said containers may move in an endwise direction along said supporting members, means for rotating said supporting members for imparting rotation to the containers as they move endwise on said supporting members, and spray devices arranged above said containers for subjecting said containers to a treating fluid as they move along said supporting members.

4. An apparatus for conveying closed cylindrical containers and treating the contents thereof including spaced cylindrical members for supporting the containers with the axes of the containers parallel with the axes of the supporting members, means for mounting said supporting members so that said members inclined downwardly from the receiving end to the delivery end whereby the containers are caused by gravity to slide endwise along said supporting members, means for rotating said supporting members for imparting a rotation to the containers as they move endwise on said supporting members, and spray devices arranged above said containers for subjecting said containers to a treating fluid as they move along said supporting members.

5. An apparatus for conveying closed cylindrical containers and treating the contents thereof including an outer supporting frame structure, an inner supporting means, spaced cylindrical members mounted on said inner supporting means for rotation on which the cylindrical containers are supported and moved in an endwise direction, means for rotating said cylindrical members, means for pivotally supporting said inner frame structure on said outer frame structure, and means for swinging said inner frame structure on its pivot and inclining and varying the inclination of the supporting members whereby the containers may be caused by gravity to move in a endwise direction along said supporting members.

6. An apparatus for conveying closed cylindrical containers and treating the contents thereof including an outer supporting frame structure, an inner supporting means, spaced cylindrical members mounted on said inner supporting means for rotation on which the cylindrical containers are supported and moved in an endwise direction, means for rotating said cylindrical members, means for pivotally supporting said inner frame structure on said outer frame structure, means for swinging said inner frame structure on its pivot and inclining and varying the inclination of the supporting members whereby the containers may be caused by gravity to move in an endwise direction along said supporting members, and spray devices arranged above said supporting members for the containers for subjecting the containers to a treating fluid as they move along said supporting members.

In testimony whereof, I affix my signature.

ARCH R. DUNBAR.